Oct. 6, 1925.
T. V. ELLIOTT
ANTISKIDDING DEVICE
Filed Jan. 5, 1921
1,556,504
2 Sheets-Sheet 1
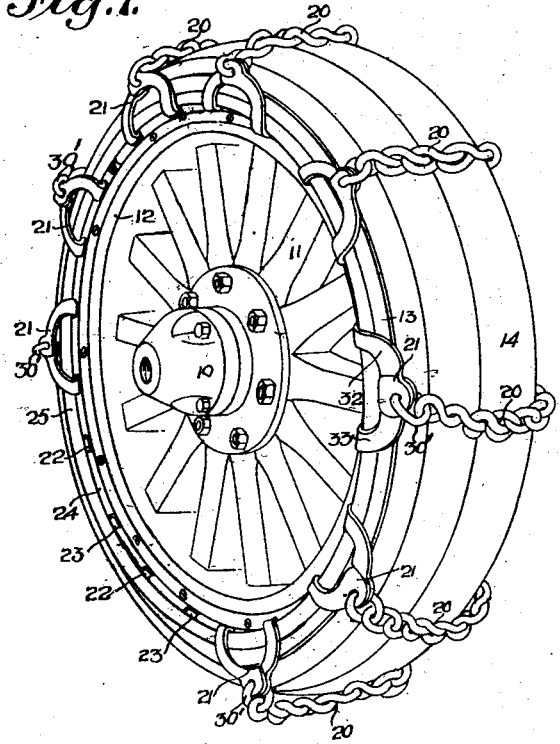
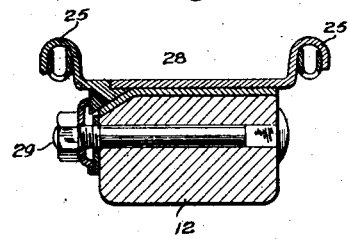
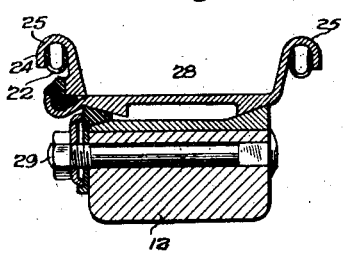
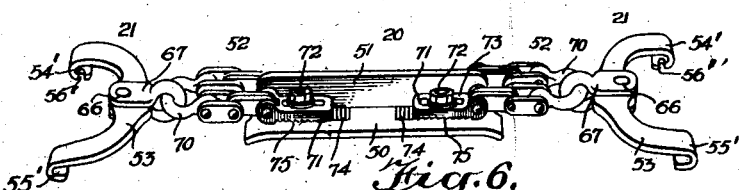
INVENTOR
THADDIOUS V. ELLIOTT
WITNESSES
ATTORNEYS Oct. 6, 1925. 1,556,504
T. V. ELLIOTT
ANTISKIDDING DEVICE
Filed Jan. 5, 1921 2 Sheets-Sheet 2
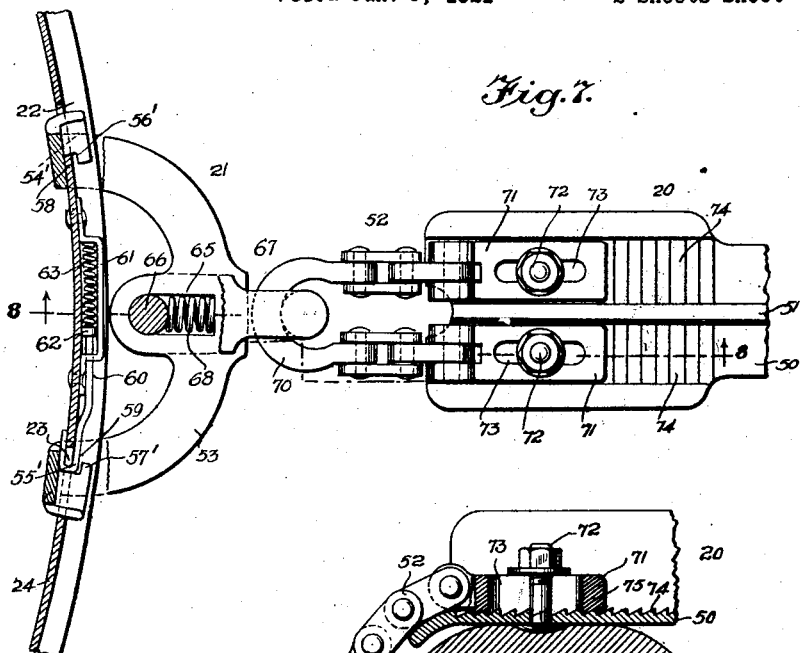
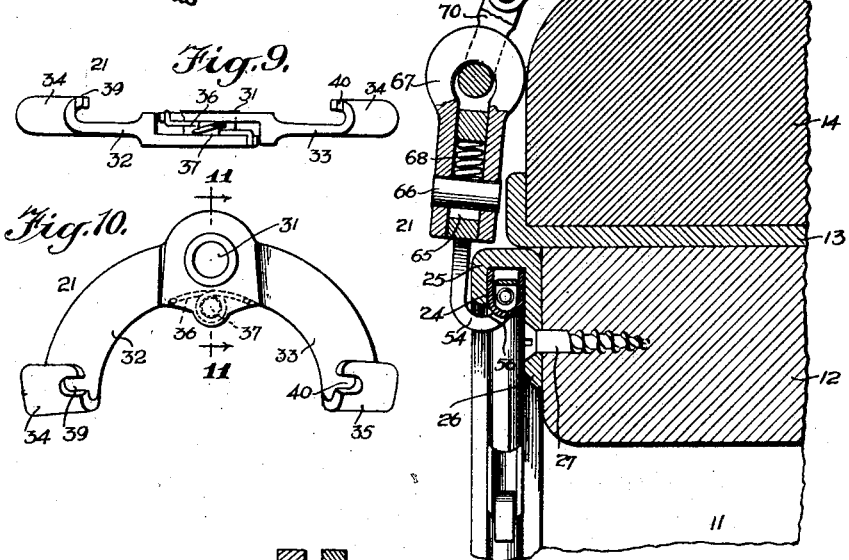
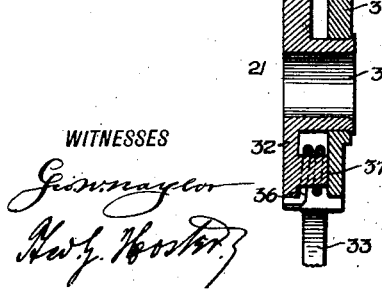
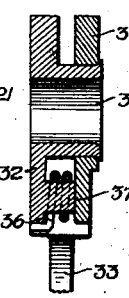
WITNESSES
INVENTOR
THADDIOUS V. ELLIOTT
BY
ATTORNEYS Patented Oct. 6, 1925.

1,556,504

UNITED STATES PATENT OFFICE.

THADDIOUS V. ELLIOTT, OF NEW BRUNSWICK, NEW JERSEY.

ANTISKIDDING DEVICE.

Application filed January 5, 1921. Serial No. 435,223.

*To all whom it may concern:*

Be it known that I, THADDIOUS V. ELLIOTT, a citizen of the United States, and a resident of New Brunswick, in the county of Middlesex and State of New Jersey, have invented a new and Improved Antiskidding Device, of which the following is a full, clear, and exact description.

The invention relates to anti-skidding devices such as shown and described in my Patent No. 1,390,893, dated September 13, 1921.

The object of the invention is to provide a new and improved anti-skidding device more especially designed for use on the wheels of auto-trucks, automobiles and similar power-driven vehicles, and arranged to prevent skidding of the vehicle and cutting or otherwise injuring the wheel tires.

Another object is to permit of readily placing the anti-skidding members in position on the peripheral face of the wheel rim or removing the same therefrom whenever it is desired to do so.

With these and other objects in view, the invention consists of certain novel features of construction, as hereinafter shown and described and then specifically pointed out in the claims.

A practical embodiment of the invention is represented in the accompanying drawings forming a part of this specification in which similar characters of reference indicate corresponding parts in all the views.

Figure 1 is a perspective view of a vehicle wheel provided with one form of the anti-skidding device;

Figure 2 is a perspective view of one of the anti-skidding members and the connection at one end thereof;

Figure 3 is a cross section of the mounting for the anti-skidding members as applied to the metallic rim of a wheel tire;

Figure 4 is a similar view of another form of the same;

Figure 5 is a perspective view of another form of one of the anti-skidding members arranged both for anti-skidding and traction purposes;

Figure 6 is a similar view of another modified form of the same;

Figure 7 is an enlarged face view of a portion of one of the anti-skidding members shown in Figure 5 and attached at one end to its mounting or carrying means, the parts being shown in extended position;

Figure 8 is a cross section of the same on the line 8—8 of Figure 7;

Figure 9 is an edge view of a modified form of one of the hooks of an anti-skidding member;

Figure 10 is a face view of the same; and

Figure 11 is an enlarged cross section of the same on the line 11—11 of Figure 10.

The anti-skidding device is shown applied to a wheel having a hub 10 from which radiates spokes 11 connected with a felloe 12 provided with a rim 13 supporting the tire 14 which may be of any approved construction. Across the tread or peripheral face of the tire 14 extend anti-skidding members 20 provided at their ends with hooks 21, preferably double hooks, engaging pairs of apertures 22, 23 (see Figure 7) formed in a ring 24 mounted to turn in an annular bearing 25 attached to the corresponding face of the wheel and concentric with the tire thereof. Each of the rings 24 is preferably made U-shape in cross section, and its corresponding bearing 25 is likewise made U-shape in cross section, as plainly shown in Figures 3, 4 and 8, to give the desired strength to the rings and bearings and to allow the rings to turn readily in their bearings independently of the turning of the wheel. As shown in Figure 8, the bearings 25 are provided at their inner faces with flanges 26 secured by screws 27 to the felloe 12. As shown in Figures 3 and 4 the bearings 25 form parts of the sectional demountable rim 28 of any approved construction and attached by suitable fastening devices 29 to the felloe 12.

The anti-skidding members 20 may be of various shapes; for instance, as shown in Figures 1 and 2, the anti-skidding members are in the form of chains extending across the peripheral face of the tire 14 in spaced relation one to the other and being held in this spaced relation by the hooks 21 engaging the corresponding pairs of apertures 22, 23 in the rings 24. Each of the end links 30' of each chain 30 engages a hollow pivot 31 formed of a hook member 32 on which the other hook member 33 is mounted to swing (see Figures 9, 10 and 11). The hook members 32, 33 have their hooks 34, 35 engaging the corresponding pair of apertures 22, 23. The hook members 32 and 33 are swung towards each other by a torsion spring 36 (see Figures 9, 10 and 11) held on a pin 37 forming part of the hook member 32, and the ends of the said spring 36 bear on the members 32, 33 to swing the same towards each other. The hooks 34, 35 are provided at their opposite edges with notches 39 and 40 engaging the corresponding walls of the apertures 22, 23 so as to lock securely the hooks 21 in position on the rings 24. It is understood that on the operator applying the hooks 21, the members 32, 33 thereof are swung slightly apart to allow the hooks 34, 35 to pass through the apertures 22, 23, and then on the operator releasing the hook members 32, 33 the notches 39, 40 engage the corresponding walls of the apertures 22, 23 to lock the link in place on the ring 24.

When it is desired to remove the anti-skidding member from the wheel then the hook members 32, 33 are pressed from each other by the operator to disengage the notches 39, 40 from the walls of the apertures 22, 23 to allow of withdrawing the hooks 34, 35 from the said apertures thereby disconnecting the hook from the corresponding ring 24. Thus it will be noticed that the anti-skidding members can be readily placed in position on the wheel or removed therefrom whenever it is desired to do so. When the wheel is running and an anti-skidding member 20 in the form of a chain moves into contact with the ground then it is held temporarily stationary by such contact and consequently the hooks of this anti-skidding member exert a pull on the rings 24 to turn the same a short distance (say about half an inch) in the bearings 25. This action is repeated on each of the skidding members 20 coming in contact with the ground and hence all the anti-skidding members of a wheel are intermittently shifted and hence extend across different portions of the peripheral surface of the tire 14 of the wheel. By the arrangement described the anti-skidding members on coming in contact with the ground prevent skidding of the vehicle, and the anti-skidding members are not liable to cut into or otherwise injure a particular part of the wheel tire owing to the shifting of the said anti-skidding members on the peripheral face of the wheel tire.

The anti-skidding member shown in Figures 5, 7 and 8 can be adjusted to creep comparatively little, if any, on the peripheral face of the wheel with a view to form a tractor member in addition to being an anti-skidding member. The combined anti-skidding and tractor member mentioned comprises a plate 50 extending across the peripheral face of the tire 14, and the plate 50 is strengthened on its outer face by a rib 51. The ends of the plate 50 are connected by chains 52 with the hooks 21 each formed of a fork-shaped body 53 terminating in hooks 54' and 55' having notches 56' and 57' at their inner opposite edges. The hooks 54' and 55' are arranged to engage the apertures 22, 23 in the ring 24, and the hook notch 56' is adapted to engage the adjacent wall 58 of the aperture 22 (see Figure 7) while the notch 57' is adapted to be engaged by the head 59 of a bolt 60 mounted to slide in a bearing 61 attached to the inside of the corresponding ring 24. The bolt 60 is provided at its inner end with a collar 62 pressed on by a spring 63 held in the bearing 61 to engage the head 59 for the bolt 60 with the notch 57' to securely lock the hook 21 in position on the ring 24, as plainly shown in Figure 7. The hook body 53 is provided at its middle with a slot 65 through which extends a pin 66 held in a shackle 67 straddling the middle portion of the hook body 53. A spring 68 is seated in the guideway 65 and bears against the pin 66 thus providing a yielding connection between the shackle 67 and the hook body 53. The eye of the shackle 67 is engaged by a link 70 forming part of the corresponding chain 52 having its end links 71 adjustably fastened by bolts 72 to the plate 50 on opposite sides of the rib 51 thereof. For the purpose mentioned the end links 71 are provided with slots 73 for the passage of the bolts 72 held on the plate 50, and the opposite or contacting faces of the plate 50 and the links 71 are provided with ratchet teeth 74, 75 in engagement with each other to prevent accidental outward sliding of the links 71 on the plate 50. From the foregoing it will be seen that by the arrangement described the connection between the hook 21 and the plate 50 can be adjusted to tighten the plate 50 on the peripheral face of the tire 14 of the wheel to any desired extent to permit very little creeping of this anti-skidding member on each contact thereof with the ground as above explained relative to the anti-skidding member 20 in the form of a chain.

In the modified form shown in Figure 6 the anti-skidding member 20 is in the form of a plate 80 provided at the middle with an inwardly bent curved portion 81 adapted to fit in the space between double tread of tires of ordinary truck wheels, and the outer face of the plate 80 is provided with spikes 82 adapted to dig in the ground to provide a firm hold for tractor purposes. The ends of the plate 80 are connected by chains 52 with double hooks 21, the same as above described with reference to the construction shown in Figures 5, 7 and 8, and hence further description of the same is not deemed necessary.

Having thus described my invention, I claim as new and desire to secure by Letters Patent:

1. In an anti-skidding device for vehicle wheels, a plurality of members each provided with a double hook at each end, rings having means detachably engaged by the said hooks, and bearings secured to the faces of the wheel and in which the said rings are mounted to turn.

2. In an anti-skidding device for vehicle wheels, a plurality of members each provided at each end with a double hook, annular bearings attached concentrically to the faces of the wheel and approximately U-shape in cross section, and rings mounted to turn in the said bearings and approximately U-shape in cross section, the rings having pairs of spaced attaching means detachably engaged by the said hooks.

3. In a wheel, anti-skidding members each provided at each end with a double hook, annular bearings attached concentrically to the faces of the wheel and approximately U-shape in cross section, and rings mounted to turn in the said bearings and approximately U-shape in cross section, each of the rings having pairs of apertures, each pair being detachably engaged by a corresponding double hook.

4. In an anti-skidding device for vehicle wheels, a member extending across the periphery of the wheel and provided with flexible ends each terminating in a double hook, rings detachably engaged by the said double hooks, locking means locking the hooks to the rings, and bearings arranged concentrically on the faces of the wheel and attached thereto, the said rings being mounted to turn in the said bearings.

5. In an anti-skidding device for vehicle wheels, a member extending across the periphery of the wheel and provided with flexible ends, and hooks yieldingly mounted on the said ends, rings engaged by the said hooks and bearings concentric on the faces of the wheel and attached thereto, the said rings being mounted to turn in the said bearings.

6. In an anti-skidding device for vehicle wheels, a member extending across the periphery of the wheel and provided with adjustable flexible ends, each having a hook, rings engaged by the said hooks and bearings arranged concentrically on the faces of the wheel and secured thereto, the said rings being mounted to turn in the said bearings.

7. In an anti-skidding device for a vehicle wheel, a ring mounted to turn on a face of the wheel and provided with spaced apertures, a double hook adapted to engage the said apertures, and a bolt mounted on the ring and engaging the said hook to lock the latter in place on the ring.

8. In an anti-skidding device for vehicle wheels, a member having a hook made in two spring-pressed pivoted parts, and a ring engaged by the said hook.

THADDIOUS V. ELLIOTT.